United States Patent
Medina Hernandez et al.

(10) Patent No.: US 12,330,302 B2
(45) Date of Patent: Jun. 17, 2025

(54) GRAPHICALLY SUPPORTED ADAPTATION OF ROBOT CONTROL PROGRAMS

(71) Applicant: Franka Emika GmbH, Munich (DE)

(72) Inventors: Jose Ramon Medina Hernandez, Munich (DE); Andreas Spenninger, Karlsfeld (DE)

(73) Assignee: FRANKA EMIKA GMBH, Munich (DE)

( * ) Notice: Subject to any disclaimer, the term of this patent is extended or adjusted under 35 U.S.C. 154(b) by 306 days.

(21) Appl. No.: 17/797,154

(22) PCT Filed: Feb. 10, 2021

(86) PCT No.: PCT/EP2021/053134
§ 371 (c)(1),
(2) Date: Aug. 3, 2022

(87) PCT Pub. No.: WO2021/160638
PCT Pub. Date: Aug. 19, 2021

(65) Prior Publication Data
US 2023/0049586 A1    Feb. 16, 2023

(30) Foreign Application Priority Data
Feb. 14, 2020  (DE) ..................... 10 2020 103 853.4

(51) Int. Cl.
*B25J 9/16*         (2006.01)
*B25J 13/06*        (2006.01)

(52) U.S. Cl.
CPC ............. *B25J 9/1605* (2013.01); *B25J 13/06* (2013.01)

(58) Field of Classification Search
CPC ........ B25J 9/1605; B25J 13/06; B25J 9/1656; G05B 2219/35507; G05B 2219/39438; G05B 19/409
See application file for complete search history.

(56) References Cited

U.S. PATENT DOCUMENTS

| | | |
|---|---|---|
| 2016/0200359 A1 | 7/2016 | Boeck et al. |
| 2018/0353253 A1 | 12/2018 | Bowling |
| (Continued) | | |

FOREIGN PATENT DOCUMENTS

| | | |
|---|---|---|
| AT | 514588 B1 | 2/2015 |
| CN | 104769962 A | 7/2015 |
| (Continued) | | |

OTHER PUBLICATIONS

English-language translation of the International Preliminary Report on Patentability issued in International Application No. PCT/EP2021/053134 on Aug. 25, 2022.

(Continued)

*Primary Examiner* — Ian Jen
*Assistant Examiner* — Renee LaRose
(74) *Attorney, Agent, or Firm* — Hoffmann & Baron, LLP

(57) ABSTRACT

A control unit to ascertain one or more parameters of a control program and/or of a control system for a robot manipulator, wherein the control unit includes: an interactive operating unit to display a first adjustment element and a specified region for the first adjustment element, wherein the first adjustment element is moveable within the specified region via an input of a user, the interactive operating unit further to detect a user-specified position of the first adjustment element and transmit the user-specified position; and a computing unit to receive the user-specified position and ascertain weightings for a specified cost function as a function of the position, wherein a sum of the weightings is constant for all positions of the adjustment element, the computing unit further to ascertain the parameters of the control program and/or of the control system for the robot manipulator based on the cost function.

16 Claims, 2 Drawing Sheets

(56) References Cited

U.S. PATENT DOCUMENTS

| | | | |
|---|---|---|---|
| 2019/0160686 A1 | 5/2019 | Riedel | |
| 2019/0317478 A1 | 10/2019 | Souma | |
| 2020/0254612 A1* | 8/2020 | Keshmiri | ............ B25J 15/0052 |

FOREIGN PATENT DOCUMENTS

| | | |
|---|---|---|
| DE | 102016208811 B3 | 10/2017 |
| DE | 102017202439 A1 | 8/2018 |
| DE | 202019105752 U1 | 12/2019 |
| DE | 102019108241 B3 | 8/2020 |
| DE | 102019117217 B3 | 8/2020 |
| JP | 2019-185467 A | 10/2019 |
| JP | 2020-523206 A | 8/2020 |
| WO | WO 2014/113091 A1 | 7/2014 |

OTHER PUBLICATIONS

Shaikh Merer T., et al., "Design and Evaluation of Adverb Palette: A GUI for Selecting Tradeoffs in Multi-Objective Optimization Problems", 2017, 12th ACM/IEEE International Conference on Human-Robot Interaction (HRI, ACM, Mar. 6, 2017), pp. 389-397.

Ellis Ratner, et al., "Simplifying Reward Design through Divide-and-Conquer", arxiv.org, Cornell University Library, 201 Olin Library Cornell University, Ithaca, NY 14853, Jun. 7, 2018.

Ehricke, Hans-Heino, et al., "The Vision Camera: an Interactive Tool for Volume Data Exploration and Navigation", Proceedings of the Conference on Visualization, San Jose, Oct. 25-29, 1993; Proceedings of the Conference on Visualization, New York, IEEE, US, vol. Oct. 25, 1993, pp. 25-30.

Shaikh, Merer T., et al., "Interactive multi-objective path planning through a palette-based user interface", Proceedings of SPIE; Proceedings of SPIE ISSN 0277-786X vol. 10524, SPIE, US, vol. 9837, May 13, 2016, pp. 98370K-98370K.

Pashkevich, Anatoly, P., et al., "Computer-aided programming of robotic manufacturing cells for laser cutting applications", Emerging Technologies and Factory Automation, 2001. Proceedings. 2001 8th IEEE International Conference on Oct. 15-18, 2001, Piscataway, NJ, USA, IEEE, Oct. 15, 2001, pp. 603-612.

Decision of Rejection and English-language translation issued in Japanese Application No. JP 2022-549099 on Jul. 2, 2024.

Office Action and English-language translation issued in Japanese Application No. JP 2022-549099 on Nov. 7, 2023.

English-language translation of Office Action issued in Chinese Application No. 202180011249.0 on Nov. 13, 2024.

English-language translation of Office Action issued in Korean Application No. 10-2022-7031320 on Oct. 16, 2024.

\* cited by examiner

GRAPHICALLY SUPPORTED ADAPTATION OF ROBOT CONTROL PROGRAMS

CROSS-REFERENCE TO RELATED APPLICATIONS

The present application is the U.S. National Phase of PCT/EP2021/053134, filed on 10 Feb. 2021, which claims priority to German Patent Application No. 10 2020 103 853.4, filed on 14 Feb. 2020, the entire contents of which are incorporated herein by reference.

BACKGROUND

Field

The invention relates to a control unit for a robot manipulator to ascertain one or more parameters of a control program and/or of a control system for a robot manipulator, and to a method of ascertaining one or more parameters of a control program and/or of a control system for a robot manipulator.

SUMMARY

The aim of the invention is to simplify the adaptation of a control system or of a control program for a robot manipulator.

The invention arises from the features of the independent claims. Advantageous developments and embodiments are subject matters of the dependent claims.

A first aspect of the invention relates to a control unit to ascertain one or more parameters of a control program and/or of a control system for a robot manipulator, wherein the control unit includes:

an interactive operating unit configured to display a first adjustment element and a specified region for the first adjustment element, wherein the first adjustment element is moveable within the specified region via an input of a user on the interactive operating unit, wherein the interactive operating unit is further configured to detect a user-specified position of the first adjustment element within the specified region and to transmit the user-specified position of the first adjustment element; and a computing unit configured to receive the user-specified position of the first adjustment element from the interactive operating unit and ascertain weightings for a specified cost function as a function of the user-specified position relative to the specified region, wherein a sum of the weightings is constant for all the positions of the first adjustment element, and wherein the computing unit is further configured to ascertain the one or more parameters of the control program and/or of the control system for the robot manipulator based on the cost function with the ascertained weightings.

In particular, the computing unit is configured to execute the adapted control program with the particularly adapted control system of the robot manipulator in order to perform a specified task.

Preferably, the control unit is arranged on the robot manipulator itself, that is to say the control unit is preferably a control unit of the robot manipulator. The control unit is used, in particular, to execute specified control programs, wherein the specified control programs are preferably accordingly adaptable, so that they can be executed in different modes. For example, it may be desired by the user that a control program is executed as quickly as possible or in the most energy-saving manner possible. In particular, a structure of a control program is specified. However, the manner in which control program can be executed, in particular, is advantageously adaptable. The adaptation of such a control program corresponds to an optimization problem in which a target function is, in particular, to be minimized or maximized (depending on the definition of the objective and the sign definition), that is to say in general to be optimized. The parameters of the control program here relate, in particular, to the parameters to be pilot-controlled by the controller (that is to say the control system), such as, in particular, a speed of the robot manipulator.

The control program is used to perform a specified task for the robot manipulator and is executed with the aid of a controller on the robot manipulator. The controller is used, in particular, to pilot-control certain variables such as a certain desired speed or a desired acceleration, or else a desired contact force of the robot manipulator with respect to an object in the environment of the robot manipulator. Such a pilot-control signal is advantageously compared to measured values, and control variables of the robot manipulator are correspondingly actuated, so that the actual variables trend toward the desired variables, in particular, of the pilot-control signal. The parts of the controller of the robot manipulator under consideration here therefore relate, in particular, to the outer loops which relate to the relevant variables for the performance of a task. In contrast to this, in particular, the inner loops of the controller are used for the motor control, that is to say for the corresponding execution of the control variables of the outer loop. The parameters of such a controller can also be used correspondingly in order to implement the aforementioned adaptation of the execution of the control program. For example, the bandwidth of a dynamic filter is increased or decreased, and the variable of feedback amplifications or amplifications in the forward branch of the controller are adapted. In particular, thereby the bandwidth of the controller of the control unit is adapted for the robot manipulator. This corresponds to an aggressiveness with which the controller of the robot manipulator pursues the task performed by the robot manipulator, either with weak amplifications, so that the robot manipulator reacts only weakly to disturbances, or with strong amplifications, so that the robot manipulator reacts very quickly and with high torque on the motors of the robot manipulator.

The parameters of the aforementioned control program and/or the parameters of the controller are therefore adapted with the aid of a cost function. The cost function is a tool of nonlinear optimization, in particular, wherein the cost function typically consists of multiple components, that is to say summands. Such components relate to parts which individually all increase the cost function. Here, these parts can be weighted differently. For example, if in a performance of the robot manipulator, a compromise is sought between quickness of performance of the task and at the same time also the wear of the robot manipulator, then the cost function preferably consists of the sum of the squares of the duration and of a measure of the wear. If this cost function is minimized, the result is, in particular, a compromise between the necessary duration and the wear of the robot manipulator. On the other hand, if a weighting of these parts of the cost function is introduced, then the focus can be put on one of the two of these in fact contradictory variables. For example, if the necessary duration is weighted with 70% and the wear of the robot manipulator is weighted with 30%, then the sum of the weightings is 100%, but, due to the higher weighting of the necessary duration, in the minimization of the cost function, the parameters of the control program and/or the parameters of the controller are adjusted tendentially in such a way that the performance of the task tends to occur in favor of the duration. This means that the task of the robot manipulator is performed relatively quickly and therefore the wear of the robot manipulator is more likely greater.

So that, for a user, such a weighting, as described above, for example, can be set as easily as possible, according to the invention, the first adjustment element is displayed on the interactive operating unit. The relative position of the first adjustment element with respect to the specified region is reflected here in the numerical values of such a weighting distribution. The user, via his/her input on the interactive operating unit, advantageously intuitively specifies this weighting. Preferably, the interactive operating unit is a touch-sensitive screen, also referred to as touchscreen. The first adjustment element here is, in particular, an enclosed graphic unit displayed on the interactive operating unit. The specified region is also displayed on the interactive operating unit, in particular, the limits of the specified region. Thus, the user advantageously visually receives the reference points such as the current position of the first adjustment element relative to the specified region and, secondly, he/she advantageously receives immediate feedback when, after an input of the user, the first adjustment element is moved relative to the region and within same.

Preferably, the respective distance of the first adjustment element from an edge point of the specified region is also graphically marked, in particular, by color, by displaying a numerical value function, in particular, the weightings themselves set by the user, or by light and dark shadings.

The computing unit here ascertains the numerical values of the weightings as a function of this position of the first adjustment element relative to the region, so that the sum of the weightings for all the positions of the first adjustment element is constant, in particular, 100% or '1' depending on the formulation. The first adjustment element accordingly can always only be moved within the specified region via an input of the user, since otherwise the sum of the weightings would exceed the specified constant value. In particular, this fact is also reflected in the graphic representation on the interactive operating unit, so that the first adjustment element cannot be moved beyond the limits of the specified region via an input of the user on the interactive operating unit.

Therefore, an advantageous effect of the invention is that the user can intuitively and reliably adapt a specified control program and/or a controller of the robot manipulator as a function of his/her desires regarding the type of performance of a task of the robot manipulator. Using the cost function with the individual weightings, the sum of which never exceeds a constant value, in particular '1' or 100%, leads to a consistent manner of execution and therefore also to a reliable manner of execution of a control program for performing a task for the robot manipulator.

According to an advantageous embodiment, the computing unit is configured to ascertain the one or more parameters of the control program and/or of the control system for the robot manipulator, based on the cost function with the ascertaining weightings, by repeated adapted and learning-based performance of a task. According to this embodiment, the cost function is used, in particular, to execute a self-learning algorithm for designing parameters of the control program and/or of the control system of the robot manipulator. Here, in particular, a specified control program is repeated multiple times, and, by a converging algorithm such as, for example, a gradient-based method or an evolution algorithm, the cost function is, in particular, minimized. Advantageously, the cost function ascertained according to the first aspect of the invention and, in particular, its weightings are thus used for the efficient adaptation of self-learning algorithms with regard to the control program and/or the control system of the robot manipulator.

According to an additional advantageous embodiment, the computing unit is configured to ascertain the one parameter or the parameters of the control program and/or of the control system for the robot manipulator by minimizing the function value of the cost function with the ascertained weightings. The cost function is used, in particular, for an optimization. Depending on the definition of the variables used and the signs used for the weightings, the cost function is either to be maximized for the purpose of an optimization or minimized as a penalty function. Usually, in the nonlinear optimization, the minimization of the cost function is used.

According to an additional advantageous embodiment, the cost function has at least one of the following variables:
- time necessary for performing a task by the robot manipulator;
- energy consumption necessary for performing the task;
- wear of the robot manipulator and/or of a workpiece during the performance of the task;
- forces and/or torques which act between an end effector of the robot manipulator and an object from the environment of the robot manipulator;
- torques which occur in the joints of the robot manipulator during the performance of the task;
- speeds of a reference point of the robot manipulator which occur during the performance of the task;
- accelerations of the reference point of the robot manipulator which occur during the performance of the task; and
- noise which occurs during the performance of the task.

According to an additional advantageous embodiment, the first adjustment element can be moved on a linear scale, wherein the computing unit is configured to ascertain at least two weightings for the specified cost function, as a function of the specified position of the first adjustment element relative to the region. According to this embodiment, the specified region has the form of a line segment with a starting point and an end point. The first adjustment element can here be moved by the user between the starting point and the end point of the line segment of the linear scale. By moving the first adjustment element, a distance on the left of the adjustment element from the starting point of the linear scale and, at the same time and correlating therewith, a distance on the right of the adjustment element from the end point of the linear scale are set. The two distances naturally correlate with one another, and when added, the distances always represent the constant length of the linear scale. This is also reflected in the weightings, the sum of which in principle remains constant, because the first distance between the first adjustment element and the starting point of the linear scale correlates with a first weighting from the cost function, and the second distance between the first adjustment element and the end point of the linear scale correlates with a second weighting from the cost function. Advantageously, for the user, the ratios of the weightings within the cost function can thus be set intuitively.

According to an additional advantageous embodiment, the specified region includes a limited plane, wherein the first adjustment element can be moved in the limited plane, wherein the computing unit is configured to ascertain at least three weightings for the specified cost function, as a function of the specified position of the first adjustment element relative to the region. Via the plane, with only one first adjustment element, more than two weightings, that is to say more than the one ratio between two weightings, can also be set. In principle, an infinite number of weightings can be set here, in particular, if a polygon is used for the limited plane.

According to an additional advantageous embodiment, the limited plane is a polygon, wherein each of the vertices of the polygon is associated with a respective variable of the specified cost function, wherein a respective distance of the first adjustment element, with respect to a respective vertex of the polygon, determines the ratio between the respective weightings in accordance with the specified position of the first adjustment element. Such a polygon advantageously offers a particularly intuitive possibility for a user to determine the ratios of the weightings for the cost function.

According to an additional advantageous embodiment, the interactive operating unit is configured to display a second adjustment element and the specified region for the first adjustment element and the second adjustment element so that the first adjustment and the second adjustment element can be moved within the specified region via an input of a user, wherein the interactive operating unit is configured to detect a user-specified position of the first adjustment element and of the second adjustment element within the specified region and to transmit a respective user-specified position of a respective adjustment element, wherein the computing unit is configured to receive the respective user-specified position of the respective adjustment element from the interactive operating unit, and further configured to ascertain at least three weightings for the specified cost function, as a function of the respective user-specified position of the respective adjustment element relative to the specified region. The first adjustment element and the second adjustment element advantageously offer a higher number of degrees of freedom for setting the weightings for the cost function.

According to an additional advantageous embodiment, the first adjustment element and the second adjustment element can be moved on a common linear scale, wherein the computing unit is configured to ascertain at least three weightings for the specified cost function, as a function of a relative position of the first adjustment element with respect to the second adjustment element and as a function of a relative position of the respective adjustment element relative to the specified region. The three weightings correlate with the relative position of the two adjustment elements with respect to one another, wherein again the sum of the weightings remains constant. Advantageously, the positions of the adjustment elements with respect to one another on a linear scale offer a highly intuitive possibility for the user to determine the weightings relative to one another.

An additional aspect of the invention relates to a method of ascertaining one or more parameters of a control program and/or of a control system for a robot manipulator via a control unit, the control unit including an interactive operating unit and a computing unit, wherein the method includes:

displaying a first adjustment element and a specified region for the first adjustment element by an interactive operating unit, wherein the first adjustment element is moveable within the specified region via an input of a user on the interactive operating unit;

detecting a user-specified position of the first adjustment element within the specified region by the interactive operating unit and transmitting the user-specified position of the first adjustment element;

receiving via the computing unit the user-specified position of the first adjustment element from the interactive operating unit and ascertaining weightings for a specified cost function via the computing unit as a function of the user-specified position of the first adjustment element relative to the specified region, wherein a sum of the weightings is constant for all positions of the adjustment element; and ascertaining via the control unit the one or more parameters of the control program and/or of the control system for the robot manipulator based on the cost function with the ascertained weightings.

Advantageous and preferred developments of the proposed method result from an analogous and appropriate transfer of the explanations made in connection with the proposed control unit.

Additional advantages, features and details result from the following description in which—possibly in reference to the drawings—at least one example embodiment is described in detail. Identical, similar, and/or functionally equivalent parts are provided with identical reference numerals.

The representations in the figures are diagrammatic and not true to scale.

DETAILED DESCRIPTION

Figure 1:
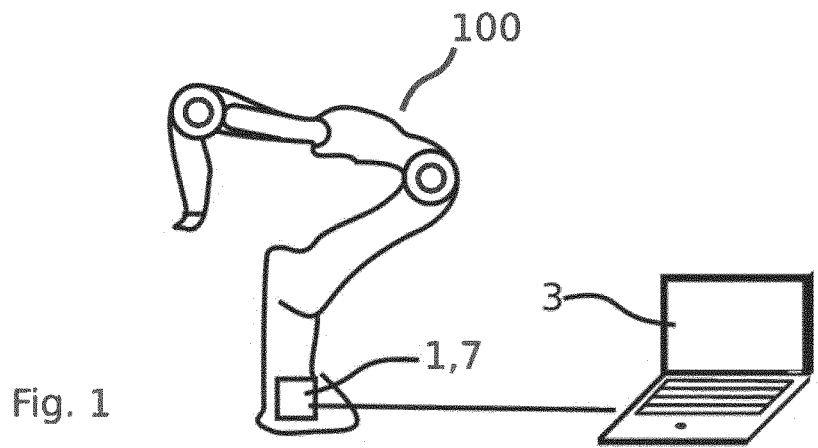
FIG. 1 shows a control unit on a robot manipulator according to an example embodiment of the invention.
Figure 2:
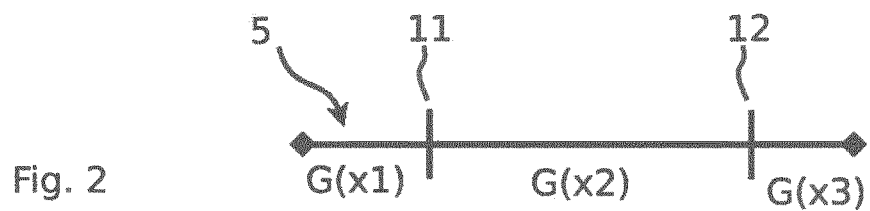
FIG. 2 shows a first and a second adjustment element and a specified region according to an additional example embodiment of the invention.
Figure 3:
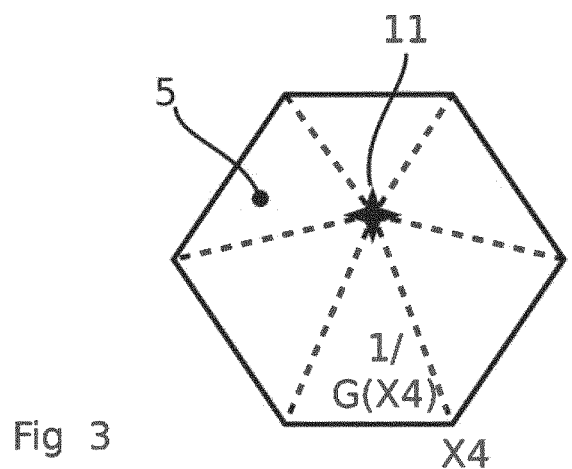
FIG. 3 shows a first adjustment element and a specified region according to an additional example embodiment of the invention.

FIG. 1 shows a control unit 1 of a robot manipulator 100. Integrated in the control unit 1 is a computing unit 7. Furthermore, an interactive operating unit 3 is part of the control unit 1, namely a user computer with a touch-sensitive screen. The interactive operating unit 3 is thus configured to both display and also detect inputs of the user. A first adjustment element 11 or a first adjustment element 11 and a second adjustment element 12 is/are displayed on the interactive operating unit 3. For this purpose, the following FIG. 2 and FIG. 3 give examples of corresponding displays. As a function at least of the specified position of the first adjustment element 11 relative to a region 5, the computing unit 7 ascertains weightings for a specified cost function, wherein a sum of the weightings is constant for all positions of the respective adjustment element 11/12. Furthermore, based on the cost function with the ascertained weightings, the computing unit 7 ascertains one or more parameters of a control program and/or of a control system for the robot manipulator 100.

A possible cost function K(x) as a function of the state variable $x=[x_1, x_2, \ldots, x_n]^T$ is here formed as follows:

$$K(x)=G(x_1)x_1^2+G(x_2)x_2^2+\ldots+G(x_n)x_n^2$$

Here, $G(x_1)$ is the weighting for the first part of the cost function as a function of the first variable $x_1$, $G(x_2)$ is the weighting for the second part of the cost function as a function of the second variable $x_2$, etc. Here, optionally, at least one of the following variables is used:
- time necessary for performing a task by the robot manipulator 100;
- energy consumption necessary for performing the task;
- wear of the robot manipulator 100 during performance of the task;
- forces and/or torques that act between an end effector of the robot manipulator 100 and an object from an environment of the robot manipulator 100;
- torques that occur in joints of the robot manipulator 100 during the performance of the task;
- speeds of a reference point of the robot manipulator 100 that occur during performance of the task;
- accelerations of the reference point of the robot manipulator 100 that occur during performance of the task; and
- noise that occurs during performance of the task.

FIG. 2 shows a display of the interactive operating unit 3. A first adjustment element 11 and a second adjustment element 12 can be moved with respect to one another and in each case with respect to a specified region 5. The mobility is possible within the specified region 5 by a contact and a swiping gesture as input of a user on the interactive unit 3. The specified region 5 here is a linear scale. The interactive operating unit 3 detects a user-specified position of the first adjustment element 11 and of the second adjustment element 12 within the specified region 5 and transmits the respective position to the computing unit 7 of the control unit 1 which, analogously to the description of FIG. 1, in turn indicates the weightings $G(x_1)$, $G(x_2)$, and $G(x_3)$ analogously to the distances between the first adjustment element 11 and the second adjustment element 12 with respect to one another and with respect to the limits of the linear specified region 5.

FIG. 3 shows an alternative display on the interactive operating unit 3. Here, the specified region 5 includes a limited plane, wherein only a first adjustment element 11 can be moved in the limited plane. As a function of the specified position of the first adjustment element 11 relative to the specified region 5, the computing unit 7 again ascertains five weightings for the specified cost function, of which, for example, in FIG. 3, the inverse of the weighting $G(x_4)$ for the variable $x_4$ is represented. The larger the distance of the first adjustment element 11 to the edge point associated with the variable $x_4$, of the limited plane designed as a polygon is, the smaller is the weighting $G(x_4)$. In this connection, in FIG. 3, the distance is correlated symbolically with $1/G(x_4)$, without actually having to use an inverse function exactly. Preferably, the sum of the distances is subdivided in accordance with the ratios. The same applies to all the other distances and their associated weightings.

Figure 4:
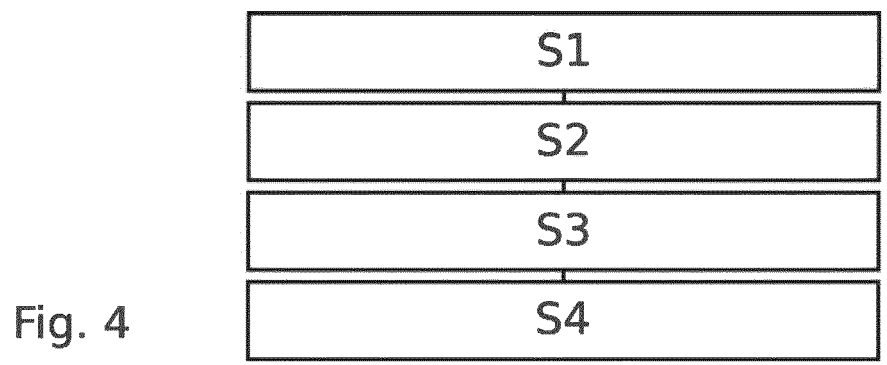
FIG. 4 shows a method of ascertaining one or more parameters of a control program and/or of a control system for a robot manipulator according to an additional example embodiment of the invention.

FIG. 4 shows a method of ascertaining one or more parameters of a control program and/or of a control system for robot manipulator 100 by a control unit 1, the control unit including an interactive operating unit 3 and a computing unit 7, wherein the method includes:
- displaying, at operation S1, a first adjustment element 11 and a specified region 5 for the first adjustment element 11 via an interactive operating unit 3, wherein the first adjustment element 11 can be moved within the specified region 5 via an input of a user on the interactive operating unit 3;
- detecting, at operation S2, a user-specified position of the first adjustment element 11 within the specified region 5 via the interactive operating unit 3 and transmitting the user-specified position of the first adjustment element 11 to the computing unit 7;
- receiving via the computing unit 7 the user-specified position of the first adjustment element transmitted from the interactive operating unit 3 and ascertaining, at operation S3, weightings for a specified cost function by the computing unit 7 as a function of the user-specified position relative to the specified region 5, wherein a sum of the weightings is constant for all positions of the adjustment element; and
- ascertaining, at operation S4, via the computing unit 7 the one or more parameters of the control program and/or of the control system for the robot manipulator 100 based on the cost function with the ascertained weightings.

Although the invention has been illustrated and explained in detail by preferred example embodiment, the invention is not limited by the disclosed examples and other variations can be derived therefrom by a person skilled in the art without leaving the scope of protection of the invention. Therefore, it is clear that multiple variation possibilities exist. It is also clear that embodiments mentioned as examples really represent only examples which in no way should be interpreted as limiting, for example, the scope of protection, the application possibilities or the configuration of the invention. Instead, the preceding description and the description of figures enable a person skilled in the art to concretely implement the example embodiments, wherein a person skilled in the art, with knowledge of the disclosed inventive idea, can make a great variety of changes, for example, with regard to the function or the arrangement of individual elements mentioned in an example embodiment, without leaving the scope of protection defined by the claims and their legal equivalents such as, for example, further explanations in the description.

LIST OF REFERENCE NUMERALS

1 Control unit
3 Operating unit
5 Region
7 Computing unit
11 First adjustment element
12 Second adjustment element
100 Robot manipulator
S1 Displaying
S2 Detecting
S3 Ascertaining
S4 Ascertaining

The invention claimed is:

1. A control unit to ascertain one or more parameters of a control program and/or of a control system for a robot manipulator, the control unit comprising:
an interactive operating unit configured to:
display a first adjustment element, a second adjustment element, and a specified region for the first adjustment element and the second adjustment element, wherein the first adjustment element and the second adjustment element are moveable within the specified region via an input of a user on the interactive operating unit; and
detect a user-specified position of the first adjustment element and the second adjustment element within the specified region and to transmit the user-specified position of the first adjustment element and the second adjustment element, wherein the first adjustment element and the second adjustment element are moveable on a common linear scale; and a computing unit configured to;
receive the user-specified position of the first adjustment element and the second adjustment element transmitted from the interactive operating unit;
ascertain at least three weightings for a specified cost function as a function of the user-specified position of the first adjustment element relative to the second adjustment element and as a function of a relative position of a respective adjustment element relative to the specified region, wherein a sum of the weightings is constant for all positions of the first adjustment element and the second adjustment element; and
ascertain the one or more parameters of the control program and/or of the control system for the robot manipulator based on the cost function with the ascertained weightings.

2. The control unit according to claim 1, wherein the computing unit is configured to ascertain the one or more parameters of the control program and/or of the control system for the robot manipulator by repeated adapted and learning-based performance of a task based on the cost function with the ascertained weightings.

3. The control unit according to claim 1, wherein the computing unit is configured to ascertain the one parameter or more parameters of the control program and/or of the control system for the robot manipulator by minimizing a function value of the cost function with the ascertained weightings.

4. The control unit according to claim 1, wherein the cost function has at least one of the following variables:
time necessary to perform a task by the robot manipulator;
energy consumption necessary to perform the task;
wear of the robot manipulator and/or of a workpiece during performance of the task;
forces and/or torques that act between an end effector of the robot manipulator and an object from an environment of the robot manipulator;
torques that occur in joints of the robot manipulator during performance of the task;
speeds of a reference point of the robot manipulator that occur during performance of the task;
accelerations of the reference point of the robot manipulator that occur during performance of the task; and
noise that occurs during performance of the task.

5. The control unit according to claim 1, wherein the first adjustment element is moveable on a linear scale, wherein the computing unit is configured to ascertain at least two weightings for the specified cost function as a function of the user-specified position of the first adjustment element relative to the specified region.

6. The control unit according to claim 1, wherein the specified region includes a limited plane, wherein the first adjustment element is moveable in the limited plane, wherein the computing unit is configured to ascertain at least three weightings for the specified cost function as a function of the user-specified position of the first adjustment element relative to the specified region.

7. The control unit according to claim 6, wherein the limited plane is a polygon having vertices, wherein each of the vertices of the polygon is associated with a respective variable of the specified cost function, wherein a respective distance of the first adjustment element with respect to a respective vertex of the polygon determines a ratio between the respective weightings in accordance with the user-specified position of the first adjustment element.

8. The control unit according to claim 1,
wherein the interactive operating unit is configured to display a second adjustment element and the specified region for the first adjustment element and the second adjustment element so that the first adjustment element and the second adjustment are moveable within the specified region via the input of the user, wherein the interactive operating unit is further configured to detect a user-specified position of the first adjustment element and of the second adjustment element within the specified region and to transmit a respective user-specified position of a respective adjustment element to the computing unit;
wherein the computing unit is configured to receive the respective user-specified position of the respective adjustment element transmitted from the interactive operating unit, and further configured to ascertain at least three weightings for the specified cost function as a function of the respective user-specified position of the respective adjustment element relative to the specified region.

9. A method of ascertaining one or more parameters of a control program and/or of a control system for a robot manipulator by a control unit, the control unit comprising an interactive operating unit and a computing unit, the method comprising:
displaying a first adjustment element, a second adjustment element, and a specified region for the first adjustment element and the second adjustment element, via an interactive operating unit, wherein the first adjustment element and the second adjustment element are moveable within the specified region via an input of a user on the interactive operating unit;
detecting a user-specified position of the first adjustment element and the second adjustment element within the specified region via the interactive operating unit and transmitting the user-specified position of the first adjustment element, wherein the first adjustment element and the second adjustment element are moveable on a common linear scale;
receiving via a computing unit the user-specified position of the first adjustment element and the second adjustment element transmitted from the interactive operating unit;
ascertaining at least three weightings for a specified cost function via the computing unit as a function of the user-specified position of the first adjustment element relative to the second adjustment element and as a function of a relative position of a respective adjustment element relative to the specified region, wherein a sum of the weightings is constant for all positions of the first adjustment element and the second adjustment element; and
ascertaining via the computing unit the one or more parameters of the control program and/or of the control system for the robot manipulator based on the cost function with the ascertained weightings.

10. The method according to claim 9, wherein the method comprises ascertaining via the computing unit the one or more parameters of the control program and/or of the control system for the robot manipulator by repeated adapted and learning-based performance of a task based on the cost function with the ascertained weightings.

11. The method according to claim 9, wherein the method comprises ascertaining via the computing unit the one parameter or more parameters of the control program and/or of the control system for the robot manipulator by minimizing a function value of the cost function with the ascertained weightings.

12. The method according to claim 9, wherein the cost function has at least one of the following variables:
time necessary to perform a task by the robot manipulator;
energy consumption necessary to perform the task;
wear of the robot manipulator and/or of a workpiece during performance of the task;
forces and/or torques that act between an end effector of the robot manipulator and an object from an environment of the robot manipulator;
torques that occur in joints of the robot manipulator during performance of the task;
speeds of a reference point of the robot manipulator that occur during performance of the task;
accelerations of the reference point of the robot manipulator that occur during performance of the task; and
noise that occurs during performance of the task.

13. The method according to claim 9, wherein the first adjustment element is moveable on a linear scale, wherein the method comprises ascertaining via the computing unit at least two weightings for the specified cost function as a function of the user-specified position of the first adjustment element relative to the specified region.

14. The method according to claim 9, wherein the specified region includes a limited plane, wherein the first adjustment element is moveable in the limited plane, wherein the method comprises ascertaining via the computing unit at least three weightings for the specified cost function as a function of the user-specified position of the first adjustment element relative to the specified region.

15. The method according to claim 14, wherein the limited plane is a polygon having vertices, wherein each of the vertices of the polygon is associated with a respective variable of the specified cost function, wherein a respective distance of the first adjustment element with respect to a respective vertex of the polygon determines a ratio between the respective weightings in accordance with the user-specified position of the first adjustment element.

16. The method according to claim 9, wherein the method further comprises:
displaying via the interactive operating unit a second adjustment element and the specified region for the first adjustment element and the second adjustment element so that the first adjustment element and the second adjustment are moveable within the specified region via the input of the user;
detecting via the interactive operating unit a user-specified position of the first adjustment element and of the second adjustment element within the specified region and transmitting a respective user-specified position of a respective adjustment element to the computing unit;
receiving via the computing unit the respective user-specified position of the respective adjustment element transmitted from the interactive operating unit and ascertaining via the computing unit at least three weightings for the specified cost function as a function of the respective user-specified position of the respective adjustment element relative to the specified region.

\* \* \* \* \*